Patented Aug. 24, 1954

2,687,414

UNITED STATES PATENT OFFICE 2,687,414

METHOD FOR PRODUCING AROMATIC AMINOALKYL AMINES

John W. Cusic, Skokie, Ill., assignor to G. D. Searle & Co., Chicago, Ill., a corporation of Illinois No Drawing. Application November 26, 1948, Serial No. 62,215

18 Claims. (Cl. 260—243)

This invention relates to methods of condensing an aminoalkyl ester with a secondary aromatic amine by the use of caustic alkali as the condensation agent, and to the products of such reactions. More particularly, this invention relates to processes for producing tertiary aromatic amines of the type

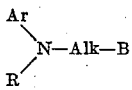

wherein Ar is an aromatic radical, R is an aromatic or aliphatic radical, Alk is a lower alkylene radical and B is an organic aliphatic or aliphatic-type amino radical, and tertiary aromatic amines of the type

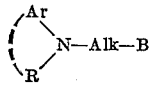

wherein

is a bivalent organic radical composed of an aromatic moiety, Ar, and an aromatic or aliphatic moiety, R, by the reaction in the presence of caustic alkali of amines of the type

and

with aminoalkyl esters of the type X—Alk—B, wherein X is a halogen or an organic sulfonate radical.

In the bivalent organic radical

discussed hereinabove, the two groupings Ar and R are linked together by a single bond or by a bivalent radical such as methylene, ethylene, carbonyl, sulfido, oxy, sulfuryl or thionyl radicals. The connecting valence bond or bivalent radical is indicated by the broken line above.

Condensations of the foregoing type have been carried out by previous workers, using as the condensation agent alkali metal amides such as sodamide. These condensation agents are highly reactive or explosive materials which are difficult to prepare, handle and ship. It is therefore desirable that processes be developed for conducting such reactions in the presence of cheap, safe, and readily available condensation agents. It is the object of this invention to provide safe and economical processes for carrying out such reactions. It is a further object to provide methods for achieving such condensations using safe and readily available condensing agents.

Ordinarily, amines having aromatic substituents are weak bases, or even acidic substances, and it has consequently been believed that such amines could not be induced to react with aminoalkyl halides or other active esters except under the influence of powerful condensation agents. I have discovered that reactions of the foregoing type can be conducted by use of solid caustic alkali as the sole condensation agent. These reactions can be conveniently and efficiently carried out in the presence or absence of inert solvents. The caustic alkali is preferably used in finely divided form, although flake, pellet, and granular modifications are also satisfactory. The preferred caustic alkalies in my processes are powdered potassium hydroxide or powdered sodium hydroxide. Other caustic alkalies such as lithium hydroxide and cesium hydroxide can be used. The use of caustic alkali greatly reduces the cost and increases safety and consequent commercial feasibility of the processes.

As secondary aromatic amines which are used as starting materials in my processes, I can use diaryl amines such as diphenylamine, dianisylamine, ditolylamine, naphthylphenylamine, and the like. Suitable also are secondary aromatic-aliphatic amines such as cyclohexylaniline, butylaniline, indoline, hexahydrocarbazole, and related amines wherein one of the bonds of the nitrogen atom is joined to an aromatic radical and a second bond of the nitrogen atom is joined to an aliphatic radical, which may be open-chain or cyclic. Other cyclic amines wherein the nitrogen atom is linked through at least one valence bond to an aromatic radical are also operable. Among such cyclic amines are carbazole, phenothiazine, phenoxazine, tetrahydrocarbazole, acridan, oxides of phenothiazine, and similar heterocyclic amines. When the nitrogen atom of the secondary aromatic amine is part of a ring, then the substituents on the amino nitrogen atom are represented by a bivalent organic radical,

When the nitrogen atom is not part of a ring, the substituents are Ar and R.

The aminoalkyl esters which are operable in my processes include secondary and tertiary aminoalkyl halides and aromatic sulfonates. These esters can be represented by the formula

wherein B represents an aliphatic or aliphatic-type organic amino radical, Alk represents a lower alkylene radical, and X represents halogen or organic sulfonate radicals. A preferred form of the amino radical B is a mono- or dialkylamino radical wherein the alkyl radicals contain from 1 to 5 carbon atoms. B can also represent aliphatic-type heterocyclic radicals such as piperidino, morpholino, pyrrolidino, and related cyclic amino radicals. The alkylene radical, Alk, represents bivalent radicals derived from saturated hydrocarbons, and includes ethylene, propylene, butylene, amylene, and polymethylene radicals. Alk preferably contains 2 to 5 carbon atoms. X represents the anionic moiety of a hydrohalic or organic sulfonic acid and includes such groups as chloro, bromo, iodo, methanesulfonate, ethanesulfonate, toluenesulfonate, benzenesulfonate and the like.

The reactions are carried out at temperatures in the range of 50–200° centigrade. As inert solvelts for the reactions, hydrocarbons boiling in the range of 50–200° C. are preferred, although other inert solvents such as high-boiling ethers are also satisfactory. In practice it is preferred to mix intimately an equivalent quantity of aminoalkyl ester and an equivalent quantity of secondary aromatic amine with one or more equivalents of caustic alkali, preferably in finely divided form. As an alternative method, two or more equivalents of alkali may be used with one equivalent of a salt of an aminoalkyl ester and one equivalent of a secondary aromatic amine. Excesses of any of the reagents are not undesirable. Generally it is preferred to use an excess of alkali in the range of 25–100%.

The products of my processes are diamines. One amino group is aromatic in character and generally will not form salts with acids. The other amino group is aliphatic in character and forms acid addition and quaternary salts with ease. The diamines of my processes may be isolated from the reaction mixture by conventional methods. If the reaction is carried out in the absence of an organic solvent, the organic products may be removed by leaching or extraction with an organic solvent, such as ether, benzene, carbon tetrachloride, chloroform, and the like. They may also be separated by extraction with dilute mineral acid such as hydrochloric and sulfuric acids. The free basic material may be obtained from acid extracts by treatment with alkali and extraction with an organic solvent. The bases are removed from the organic solvents by evaporation and distillation. If the reaction is carried out in an organic solvent, the solvent may be separated from the inorganic materials by decantation, filtration, or the like, and the organic basic material may be removed from the organic solvent by extraction with acid.

The products of this invention are useful in the manufacture of medicinal agents. Certain of them are valuable histamine antagonists and antispasmodic agents. Others are valuable as intermediates in the manufacture of pharmaceutical preparations.

This application is a continuation-in-part of my copending applications Serial No. 703,703, filed October 17, 1946, which discloses the reaction of phenothiazine and β-dimethylaminoethyl chloride, now abandoned; Serial No. 753,049, filed June 6, 1947, now Patent No. 2,629,719, which discloses and claims 10-(dialkylaminoalkyl)phenothiazine 5-oxides and 10-(dialkylaminoalkyl) thiaxanthene 5-oxides and salts thereof; Serial No. 754,075, filed June 11, 1947, which discloses the reaction of phenothiazine and dimethylaminoalkyl halides, now abandoned; Serial No. 754,076, filed June 11, 1947, which discloses the reaction of phenothiazine and aminoalkyl halides, now abandoned; and Serial No. 28,529, filed May 21, 1948, which discloses the reaction of acridan and aminoalkyl halides, now abandoned; and of the copending applications of Richard A. Robinson and myself, Serial No. 753,050, filed June 6, 1947, now Patent No. 2,590,125, which discloses and claims quaternary ammonium salts of 10-(aminoalkyl)phenothiazines, and of myself and Clinton A. Dornfield, Serial No. 54,824, filed October 15, 1948, now Patent No. 2,541,211, issued February 13, 1951, which discloses and claims 9 - (tertiary - aminoalkyl)tetrahydrocarbazoles and salts thereof.

My invention is further disclosed by the following examples, which are provided for the purpose of illustrating in detail the process of my invention, but which are not to be construed as limiting the spirit or scope of the invention in any way. Relative amounts of material are given in parts by weight unless otherwise indicated.

*Example 1*

334 parts of diphenylamine, 540 parts of β-diethylaminoethyl chloride, and 160 parts of powdered sodium hydroxide are thoroughly mixed and heated to about 100° C. The reaction mixture becomes solid in about 2 hours at 100° C., and more β-diethylaminoethyl chloride is added to aid agitation. The mixture is heated for 13 hours at about 100° C. It is then extracted with ether. The ether solution is washed with water, dried and evaporated. The residue of N-β-diethylaminoethyl-diphenylamine distils at 166–168° C. at 7 millimeters pressure. The hydrochloride of this base melts at 167–168° C. after recrystallization from methyl ethyl ketone or isopropanol.

*Example 2*

An intimate mixture of 167 parts of carbazole, 270 parts of β-diethylaminoethyl chloride, and 160 parts of powdered caustic soda is heated with occasional agitation for 9 hours at 100° C. and for 15 hours at 65° C. The mixture is extracted with ether, washed with water, dried and evaporated. The 9-β-diethylaminoethylcarbazole is obtained as a viscous residue. This is dissolved in dry ether, treated with decolorizing charcoal, filtered and reacted with an excess of methyl iodide. The crystalline methiodide melts at 188–190° C.

*Example 3*

167 parts of carbazole, 270 parts of β-diethylaminoethyl chloride and 225 parts of powdered potassium hydroxide are reacted as in Example 1. 9-β-diethylaminoethylcarbazole is isolated as in Example 1 and distils at 197–200° C. at 6 mm. pressure. It forms a crystalline hydrochloride melting at 124–125° C.

*Example 4*

A thorough mixture of 394 parts of phenothiazine, 500 parts of β-diethylaminoethyl chloride, and 200 parts of powdered caustic potash is heated at 95–100° C. A vigorous reaction rapidly ensues, and cooling is required to maintain the temperature below 100° C. After the reaction has subsided, the mixture is dissolved in ether, washed with water, dried and evaporated. The residue of 10-β-diethylaminoethylphenothiazine is purified by solution in 1200 parts of hot petroleum ether, chilling and filtration to remove phenothiazine. The filtrate is stripped of solvent and the residue of purified 10-β-diethylaminoethylphenothiazine is distilled under vacuum; boiling point, 208–212° C. at 6 mm. pressure. This base forms a hydrochloride which melts at 180–183° C.

Example 5

171 parts of tetrahydrocarbazole, 340 parts of β-diethylaminoethyl chloride hydrochloride and 300 parts of powdered potassium hydroxide are mixed. A spontaneous reaction occurs. After this subsides, the reaction mixture is heated for 9 hours at 95–100° C. with occasional agitation. The organic base (9-β-diethylaminoethyltetrahydrocarbazole) is isolated as in Example 1, and distils at 184–185° C. at 5 mm. pressure. This base forms a crystalline hydrochloride melting at 139–140° C.

Example 6

175 parts of cyclohexylaniline, 340 parts of β-diethylaminoethyl chloride hydrochloride, and 300 parts of powdered potassium hydroxide are mixed and heated at 90–100° C. for 6 hours. The N-β-diethylaminoethyl-cyclohexylaniline is isolated as in Example 1 and distils at 156–160° C. at 4 mm. pressure.

Example 7

50 parts of carbazole, 56 parts of potassium hydroxide pellets, and 80 parts of dry toluene are heated to reflux, and 72 parts of β-dimethylaminoethyl chloride hydrochloride are added over a period of 2 hours with good agitation. Then 20 parts of potassium hydroxide pellets are added and the reaction mixture is refluxed and agitated for 2 hours longer. The organic solution is removed, washed with water, and extracted with dilute hydrochloric acid. A precipitate of 9-β-dimethylaminoethylcarbazole hydrochloride forms. This is collected on a filter, dried and recrystallized from alcohol. This salt melts at 241–242° C.

Example 8

513 parts of tetrahydrocarbazole, 560 parts of powdered caustic potash, and 800 parts of dry toluene are agitated and refluxed while 720 parts of β-dimethylaminoethyl chloride hydrochloride are added over 2 hours. The organic layer is removed, washed with water, and extracted with dilute hydrochloric acid. A precipitate of the hydrochloride of 9-β-dimethylaminoethyltetrahydrocarbazole forms. This is collected on a filter, dried, recrystallized from alcohol and melts at 243–244° C.

Example 9

338 parts of diphenylamine, 650 parts of dry toluene, and 400 parts of powdered commercial caustic soda are heated to reflux. Then 432 parts of β-dimethylaminoethyl chloride hydrochloride are added gradually. After the addition is complete, the mixture is agitated and refluxed for 3 hours more. The chilled mixture is diluted with ether and the organic fraction is removed, washed with water, and extracted with dilute hydrochloric acid. A precipitate of N-β-dimethylaminoethyl-diphenylamine hydrochloride forms. This is removed, dried, and recrystallized from alcohol; melting point, 246–247° C.

Example 10

26.4 g. of β-diethylaminopropanol is treated in benzene with 47.6 g. of thionyl chloride. After the reaction has ceased, toluene is added and excess thionyl chloride is removed by distillation. The suspension of β-diethylaminopropyl chloride hydrochloride is reacted with 38.9 g. of phenothiazine and 32 g. of powdered sodium hydroxide at 95° C. The product, 10 - (β - diethylaminopropyl) phenothiazine is isolated by extraction with dilute acid, alkalization of the acid extract, extraction with ether, and evaporation. This material distils at 204–207° C. at 3 mm. The hydrochloride is prepared by treating a dry ether solution of the base with alcoholic hydrogen chloride, and after recrystallization from isopropanol melts at 215–216° C.

Example 11

A mixture of 60 g. of phenothiazine, 40 g. of powdered sodium hydroxide, and 300 cc. of toluene is stirred and heated to 90–100° C. To it is added dropwise a solution of γ-dimethylaminopropyl chloride in ether and toluene (prepared by treating 47.2 g. of 1-chloro-3-bromopropane in ether with 27 g. of dimethylamine in toluene and filtering the reaction mixture). The mass is heated and stirred overnight and then extracted with dilute hydrochloric acid. The acid extract is made basic and extracted with ether. The ether extract is washed, dried and evaporated. 10 - (γ - dimethylaminopropyl) phenothiazine so isolated distils at 203–205° C. at 3 mm. pressure.

Example 12

43 parts of phenothiazine-5-monoxide, 32 parts of powdered sodium hydroxide, and 240 parts of dry toluene are stirred and heated to 95° C. while 36 parts of β-dimethylaminoethyl chloride hydrochloride are added in portions. The mixture is heated and stirred at 95–105° C. for 15 hours, and then filtered hot. The filtrate is chilled, and a precipitate of 10-β-dimethylaminoethylphenothiazine - 5 - monoxide forms. This base is removed by filtration and dried. It melts at 132–133° C.

Example 13

59.7 g. of phenothiazine, 40 g. of powdered sodium hydroxide, 67 g. of β-N-piperidinoethyl chloride hydrochloride, and 500 cc. of toluene are heated and stirred at 95–100° C. for 4 hours. The reaction mixture is filtered and evaporated. The residue of 10-β-N-piperidinoethyl phenothiazine distils at 225–235° C. at 3–4 mm. pressure. It forms a crystalline hydrochloride melting at 172–174° C.

Example 14

A suspension of 120 g. of phenothiazine, 90 g. of β-dimethylaminopropyl chloride hydrochloride and 80 g. of powdered sodium hydroxide in 1 liter of toluene is stirred at 95–100° C. for 5–6 hours. The reaction mixture is filtered and the filtrate is extracted with dilute hydrochloric acid. The acid solution is made alkaline and extracted with benzene. The benzene is washed with water and dried with anhydrous potassium carbonate. The benzene is evaporated and the residue of 10-(β-dimethylaminopropyl)phenothiazine is distilled at 192-200° C. at 3 millimeters pressure. An ethereal solution of the base, on treatment with alcoholic hydrogen chloride, precipitates the hydrochloride, which, after trituration with methyl ethyl ketone, melts at 205-207° C. The citrate, prepared in an analogous way, melts with decomposition at 157-158° C.

Example 15

A thorough mixture of 398 parts of phenothiazine, 170 parts of β-N-pyrrolidinoethyl chloride hydrochloride and 240 parts of powdered caustic soda is heated at 95-100° C. for 10 hours. The chilled mixture is taken up in ether, filtered, washed with water, dried and evaporated. The residue of 10-β-N-pyrrolidinoethylphenothiazine is distilled under reduced pressure; B. P. 222-226° C. at 2 mm. pressure. The base in dry ether forms a crystalline hydrochloride when treated with an excess of absolute alcoholic hydrogen chloride. This salt melts at 196-197° C.

Example 16

An intimate mixture of 334 parts of diphenylamine, 680 parts of γ-diethylaminopropyl chloride and 108 parts of powdered lithium hydroxide is heated to about 100° C. for 15 hours with occasional agitation. The chilled mass is leached with ether and the ether solution is evaporated. The residue of N-γ-diethylaminopropyl-diphenylamine distils at 161-164° C. at 5 mm. pressure.

Example 17

To a mixture of 100 g. of phenothiazine, 60 g. of powdered potassium hydroxide, and 500 cc. of dry toluene at 95° C. are added 86 g. of β-dimethylaminobutyl chloride hydrochloride over a period of about 5 minutes. The mixture is heated and agitated at about 95-100° C. for several hours, and then left at about 65° C. overnight. The hot reaction mixture is then filtered, and the toluene is stripped off under vacuum. The residue of 10-β-dimethylaminobutylphenothiazine distils at 200-210° C. at 4.5 mm. pressure. This base forms a crystalline citrate in isopropanol which melts at 142-145° C.

Example 18

100 g. of phenoxazine, 60 g. of powdered sodium hydroxide, and 500 cc. of dry toluene at 100° C. are reacted with 54 g. of dimethylaminoethyl chloride over a period of 10 hours, as in Example 17. The 10-β-dimethylaminoethylphenoxazine is isolated as above. It forms a crystalline hydrochloride in ether which melts at 241° C.

Example 19

A mixture of 50 g. of carbazole, 40 g. of granular caustic soda, and 100 cc. of toluene is heated to about 100° C., and 79 g. of β-dimethylaminopropyl chloride hydrochloride are added slowly. The reaction mixture is then heated and agitated at about 80° C. for 15 hours. It is filtered while hot, and the filtrate is stripped of solvent. The residue of 9-β-dimethylaminopropylcarbazole distils at 157° C. at 0.3 mm. pressure. It forms a crystalline hydrochloride in dry ether which melts at about 235° C.

Example 20

100 g. of diphenylamine and 50 g. of flake caustic soda in 250 cc. of dry toluene are brought to about 100° C. while 79 g. of β-dimethylaminopropyl chloride hydrochloride are added over a period of ½ hour. The mixture is maintained at about 100° C. for 10 hours, then filtered hot and evaporated. The residue of N-β-dimethylaminopropyl-diphenylamine is converted in anhydrous ether to the hydrochloride, by reaction with a slight excess of alcoholic hydrogen chloride. The precipitate of the hydrochloride is crystallized from methyl ethyl ketone and melts at 161-162° C.

Example 21

51.3 g. of tetrahydrocarbazole, 40 g. of sodium hydroxide, 1 liter of dry toluene, and 79 g. of β-dimethylaminopropyl chloride hydrochloride are reacted as in Example 19. The 9-β-dimethylaminopropyltetrahydrocarbazole is isolated as in Example 19 and distils at 138-145° C. at 0.15 mm. pressure.

Example 22

39.8 g. of phenothiazine, 28.8 g. of dimethylaminoethyl chloride hydrochloride and 24 g. of powdered or flaked sodium hydroxide are stirred together with about 75 cc. of benzene or toluene and heated on a steam bath for a period of from 5 to 6 hours. After cooling, the mixture is filtered, the inorganic residue further extracted with ether or benzene, and the combined filtrate and extract is washed with dilute aqueous hydrochloric acid. This acid solution is then made alkaline with sodium or potassium hydroxide, and the crude 10-(dimethylaminoethyl)phenothiazine extracted with ether. Upon removal of the solvent, the compound can be purified by vacuum distillation. The distillate is obtained as an oil which crystallizes upon standing for several days. It can be purified by recrystallization from petroleum ether if desired; M. P. 42° C.

Example 23

A mixture of 100 g. of phenothiazine and 60 g. of powdered sodium hydroxide in 500 cc. of toluene is heated to 95° C., and 86 g. of β-dimethylaminobutyl chloride hydrochloride is added during 5 minutes. The mixture is heated at 95-100° C. with stirring for several hours and left overnight at about 65° C. The suspension is filtered while warm and the solvents evaporated. The residue of 10-(β-dimethylaminobutyl)phenothiazine is distilled through a short column and boils at 200-210° C. at 4.5 mm. The citrate is prepared in isopropanol and, when washed with ether and dried, melts at 142-145° C.

Example 24

An intimate mixture of 100 parts of phenothiazine, 75 parts of 1-N-pyrrolidino-2-chloropropane and 30 parts of powdered sodium hydroxide is heated at 90-100° C. for 12 hours. The chilled reaction mixture is leached with ether and the ether solution is dried and evaporated. The residue of 10-β-N-pyrrolidinopropylphenothiazine distils at 212-216° C. at 1 mm. pressure.

By a similar procedure, using 75 parts of γ-N-pyrrolidinopropyl chloride, there is produced 10-γ-N-pyrrolidinopropylphenothiazine, B. P. 210-213° C. at 1 mm. pressure.

Example 25

A suspension of 13.9 g. of phenothiazine dioxide, 9 g. of β-dimethylaminopropyl chloride hydrochloride, 8 g. of powdered sodium hydroxide in 100 cc. of dry toluene is agitated at 95-100° C. for 6 hours. The reaction mixture is then filtered and the filtrate is extracted with dilute mineral acid. The acid extract is made basic and extracted with benzene. The benzene extract is ride, and 200 parts of powdered caustic potash is heated at 95–100° C. A vigorous reaction rapidly ensues, and cooling is required to maintain the temperature below 100° C. After the reaction has subsided, the mixture is dissolved in ether, washed with water, dried and evaporated. The residue of 10-β-diethylaminoethylphenothiazine is purified by solution in 1200 parts of hot petroleum ether, chilling and filtration to remove phenothiazine. The filtrate is stripped of solvent and the residue of purified 10-β-diethylaminoethylphenothiazine is distilled under vacuum; boiling point, 208–212° C. at 6 mm. pressure. This base forms a hydrochloride which melts at 180–183° C.

Example 5

171 parts of tetrahydrocarbazole, 340 parts of β-diethylaminoethyl chloride hydrochloride and 300 parts of powdered potassium hydroxide are mixed. A spontaneous reaction occurs. After this subsides, the reaction mixture is heated for 9 hours at 95–100° C. with occasional agitation. The organic base (9-β-diethylaminoethyltetrahydrocarbazole) is isolated as in Example 1, and distils at 184–185° C. at 5 mm. pressure. This base forms a crystalline hydrochloride melting at 139–140° C.

Example 6

175 parts of cyclohexylaniline, 340 parts of β-diethylaminoethyl chloride hydrochloride, and 300 parts of powdered potassium hydroxide are mixed and heated at 90–100° C. for 6 hours. The N-β-diethylaminoethyl-cyclohexylaniline is isolated as in Example 1 and distils at 156–160° C. at 4 mm. pressure.

Example 7

50 parts of carbazole, 56 parts of potassium hydroxide pellets, and 80 parts of dry toluene are heated to reflux, and 72 parts of β-dimethylaminoethyl chloride hydrochloride are added over a period of 2 hours with good agitation. Then 20 parts of potassium hydroxide pellets are added and the reaction mixture is refluxed and agitated for 2 hours longer. The organic solution is removed, washed with water, and extracted with dilute hydrochloric acid. A precipitate of 9-β-dimethylaminoethylcarbazole hydrochloride forms. This is collected on a filter, dried and recrystallized from alcohol. This salt melts at 241–242° C.

Example 8

513 parts of tetrahydrocarbazole, 560 parts of powdered caustic potash, and 800 parts of dry toluene are agitated and refluxed while 720 parts of β-dimethylaminoethyl chloride hydrochloride are added over 2 hours. The organic layer is removed, washed with water, and extracted with dilute hydrochloric acid. A precipitate of the hydrochloride of 9-β-dimethylaminoethyltetrahydrocarbazole forms. This is collected on a filter, dried, recrystallized from alcohol and melts at 243–244° C.

Example 9

338 parts of diphenylamine, 650 parts of dry toluene, and 400 parts of powdered commercial caustic soda are heated to reflux. Then 432 parts of β-dimethylaminoethyl chloride hydrochloride are added gradually. After the addition is complete, the mixture is agitated and refluxed for 3 hours more. The chilled mixture is diluted with ether and the organic fraction is removed, washed with water, and extracted with dilute hydrochloric acid. A precipitate of N - β - dimethylaminoethyl - diphenylamine hydrochloride forms. This is removed, dried, and recrystallized from alcohol; melting point, 246–247° C.

Example 10

26.4 g. of β-diethylaminopropanol is treated in benzene with 47.6 g. of thionyl chloride. After the reaction has ceased, toluene is added and excess thionyl chloride is removed by distillation. The suspension of β-diethylaminopropyl chloride hydrochloride is reacted with 38.9 g. of phenothiazine and 32 g. of powdered sodium hydroxide at 95° C. The product, 10 - (β - diethylaminopropyl) phenothiazine is isolated by extraction with dilute acid, alkalization of the acid extract, extraction with ether, and evaporation. This material distils at 204–207° C. at 3 mm. The hydrochloride is prepared by treating a dry ether solution of the base with alcoholic hydrogen chloride, and after recrystallization from isopropanol melts at 215–216° C.

Example 11

A mixture of 60 g. of phenothiazine, 40 g. of powdered sodium hydroxide, and 300 cc. of toluene is stirred and heated to 90–100° C. To it is added dropwise a solution of γ-dimethylaminopropyl chloride in ether and toluene (prepared by treating 47.2 g. of 1-chloro-3-bromopropane in ether with 27 g. of dimethylamine in toluene and filtering the reaction mixture). The mass is heated and stirred overnight and then extracted with dilute hydrochloric acid. The acid extract is made basic and extracted with ether. The ether extract is washed, dried and evaporated. 10 - (γ - dimethylaminopropyl) phenothiazine so isolated distils at 203–205° C. at 3 mm. pressure.

Example 12

43 parts of phenothiazine-5-monoxide, 32 parts of powdered sodium hydroxide, and 240 parts of dry toluene are stirred and heated to 95° C. while 36 parts of β-dimethylaminoethyl chloride hydrochloride are added in portions. The mixture is heated and stirred at 95–105° C. for 15 hours, and then filtered hot. The filtrate is chilled, and a precipitate of 10-β-dimethylaminoethylphenothiazine - 5 - monoxide forms. This base is removed by filtration and dried. It melts at 132–133° C.

Example 13

59.7 g. of phenothiazine, 40 g. of powdered sodium hydroxide, 67 g. of β-N-piperidinoethyl chloride hydrochloride, and 500 cc. of toluene are heated and stirred at 95–100° C. for 4 hours. The reaction mixture is filtered and evaporated. The residue of 10-β-N-piperidinoethyl phenothiazine distils at 225–235° C. at 3–4 mm. pressure. It forms a crystalline hydrochloride melting at 172–174° C.

Example 14

A suspension of 120 g. of phenothiazine, 90 g. of β-dimethylaminopropyl chloride hydrochloride and 80 g. of powdered sodium hydroxide in 1 liter of toluene is stirred at 95–100° C. for 5–6 hours. The reaction mixture is filtered and the filtrate is extracted with dilute hydrochloric acid. The acid solution is made alkaline and extracted with benzene. The benzene is washed with water and dried with anhydrous potassium carbonate. The benzene is evaporated and the residue of 10-(β-dimethylaminopropyl)phenothiazine is distilled at 192–200° C. at 3 millimeters pressure. An ethereal solution of the base, on treatment with alcoholic hydrogen chloride, precipitates the hydrochloride, which, after trituration with methyl ethyl ketone, melts at 205–207° C. The citrate, prepared in an analogous way, melts with decomposition at 157–158° C.

*Example 15*

A thorough mixture of 398 parts of phenothiazine, 170 parts of β-N-pyrrolidinoethyl chloride hydrochloride and 240 parts of powdered caustic soda is heated at 95–100° C. for 10 hours. The chilled mixture is taken up in ether, filtered, washed with water, dried and evaporated. The residue of 10-β-N-pyrrolidinoethylphenothiazine is distilled under reduced pressure; B. P. 222–226° C. at 2 mm. pressure. The base in dry ether forms a crystalline hydrochloride when treated with an excess of absolute alcoholic hydrogen chloride. This salt melts at 196–197° C.

*Example 16*

An intimate mixture of 334 parts of diphenylamine, 680 parts of γ-diethylaminopropyl chloride and 108 parts of powdered lithium hydroxide is heated to about 100° C. for 15 hours with occasional agitation. The chilled mass is leached with ether and the ether solution is evaporated. The residue of N-γ-diethylaminopropyl-diphenylamine distils at 161–164° C. at 5 mm. pressure.

*Example 17*

To a mixture of 100 g. of phenothiazine, 60 g. of powdered potassium hydroxide, and 500 cc. of dry toluene at 95° C. are added 86 g. of β-dimethylaminobutyl chloride hydrochloride over a period of about 5 minutes. The mixture is heated and agitated at about 95–100° C. for several hours, and then left at about 65° C. overnight. The hot reaction mixture is then filtered, and the toluene is stripped off under vacuum. The residue of 10-β-dimethylaminobutylphenothiazine distils at 200–210° C. at 4.5 mm. pressure. This base forms a crystalline citrate in isopropanol which melts at 142–145° C.

*Example 18*

100 g. of phenoxazine, 60 g. of powdered sodium hydroxide, and 500 cc. of dry toluene at 100° C. are reacted with 54 g. of dimethylaminoethyl chloride over a period of 10 hours, as in Example 17. The 10-β-dimethylaminoethylphenoxazine is isolated as above. It forms a crystalline hydrochloride in ether which melts at 241° C.

*Example 19*

A mixture of 50 g. of carbazole, 40 g. of granular caustic soda, and 100 cc. of toluene is heated to about 100° C., and 79 g. of β-dimethylaminopropyl chloride hydrochloride are added slowly. The reaction mixture is then heated and agitated at about 80° C. for 15 hours. It is filtered while hot, and the filtrate is stripped of solvent. The residue of 9-β-dimethylaminopropylcarbazole distils at 157° C. at 0.3 mm. pressure. It forms a crystalline hydrochloride in dry ether which melts at about 235° C.

*Example 20*

100 g. of diphenylamine and 50 g. of flake caustic soda in 250 cc. of dry toluene are brought to about 100° C. while 79 g. of β-dimethylaminopropyl chloride hydrochloride are added over a period of ½ hour. The mixture is maintained at about 100° C. for 10 hours, then filtered hot and evaporated. The residue of N-β-dimethylaminopropyl-diphenylamine is converted in anhydrous ether to the hydrochloride, by reaction with a slight excess of alcoholic hydrogen chloride. The precipitate of the hydrochloride is crystallized from methyl ethyl ketone and melts at 161–162° C.

*Example 21*

51.3 g. of tetrahydrocarbazole, 40 g. of sodium hydroxide, 1 liter of dry toluene, and 79 g. of β-dimethylaminopropyl chloride hydrochloride are reacted as in Example 19. The 9-β-dimethylaminopropyltetrahydrocarbazole is isolated as in Example 19 and distils at 138–145° C. at 0.15 mm. pressure.

*Example 22*

39.8 g. of phenothiazine, 28.8 g. of dimethylaminoethyl chloride hydrochloride and 24 g. of powdered or flaked sodium hydroxide are stirred together with about 75 cc. of benzene or toluene and heated on a steam bath for a period of from 5 to 6 hours. After cooling, the mixture is filtered, the inorganic residue further extracted with ether or benzene, and the combined filtrate and extract is washed with dilute aqueous hydrochloric acid. This acid solution is then made alkaline with sodium or potassium hydroxide, and the crude 10-(dimethylaminoethyl)phenothiazine extracted with ether. Upon removal of the solvent, the compound can be purified by vacuum distillation. The distillate is obtained as an oil which crystallizes upon standing for several days. It can be purified by recrystallization from petroleum ether if desired; M. P. 42° C.

*Example 23*

A mixture of 100 g. of phenothiazine and 60 g. of powdered sodium hydroxide in 500 cc. of toluene is heated to 95° C., and 86 g. of β-dimethylaminobutyl chloride hydrochloride is added during 5 minutes. The mixture is heated at 95–100° C. with stirring for several hours and left overnight at about 65° C. The suspension is filtered while warm and the solvents evaporated. The residue of 10-(β-dimethylaminobutyl)phenothiazine is distilled through a short column and boils at 200–210° C. at 4.5 mm. The citrate is prepared in isopropanol and, when washed with ether and dried, melts at 142–145° C.

*Example 24*

An intimate mixture of 100 parts of phenothiazine, 75 parts of 1-N-pyrrolidino-2-chloropropane and 30 parts of powdered sodium hydroxide is heated at 90–100° C. for 12 hours. The chilled reaction mixture is leached with ether and the ether solution is dried and evaporated. The residue of 10-β-N-pyrrolidinopropylphenothiazine distils at 212–216° C. at 1 mm. pressure.

By a similar procedure, using 75 parts of γ-N-pyrrolidinopropyl chloride, there is produced 10-γ-N-pyrrolidinopropylphenothiazine, B. P. 210–213° C. at 1 mm. pressure.

*Example 25*

A suspension of 13.9 g. of phenothiazine dioxide, 9 g. of β-dimethylaminopropyl chloride hydrochloride, 8 g. of powdered sodium hydroxide in 100 cc. of dry toluene is agitated at 95–100° C. for 6 hours. The reaction mixture is then filtered and the filtrate is extracted with dilute mineral acid. The acid extract is made basic and extracted with benzene. The benzene extract is washed, dried and evaporated, affording 10-(β-dimethylaminopropyl)phenothiazine - 5 - dioxide.

Example 26

A solution of 26.4 g. of γ-dimethylamino-β,β-dimethylpropanol in 100 cc. of chloroform is converted into γ-dimethylamino-β,β-dimethylpropyl chloride hydrochloride by reaction with a solution of 47.6 g. of thionyl chloride in 100 cc. of chloroform. The reaction mixture is refluxed for two hours and then evaporated to remove chloroform and excess thionyl chloride. The salt thus isolated is reacted at 90–100° C. with 38.9 g. of phenothiazine in the presence of 45 g. of powdered potassium hydroxide and 400 cc. of toluene. The mass is filtered and the filtrate extracted with dilute acid. Alkalization of the acid solution and extraction with benzene, followed by drying and evaporation of the solvent, gives 10-(γ-dimethylamino-β,β-dimethylpropyl)-phenothiazine.

Example 27

By a similar procedure to that of Example 26, employing 10 g. of β-butylaminoethyl chloride hydrochloride, 12 g. of phenothiazine, 7 g. of powdered sodium hydroxide and 60 cc. of toluene, there is obtained 10-(β-butylaminoethyl)-phenothiazine as a light-colored oil.

Example 28

To 27 parts of acridan in 87 parts of toluene at 100° C. are added 24 parts of powdered sodium hydroxide. Then 36 parts of dimethylaminoethyl chloride hydrochloride are added in small portions over a period of ½ hour. The mixture is stirred at 100° C. for about 3–4 hours longer. Then water and ether are added to the chilled reaction mixture. The water layer is separated, and the organic layer is extracted with dilute hydrochloric acid. The acid extract is made alkaline and extracted with ether. The ether extract is washed with water and dried over anhydrous potassium carbonate. After evaporation of the solvent, the residue of 10-β-dimethylaminoethylacridan is distilled at 180–190° C. at 3–4 mm. pressure. The hydrochloride is prepared by reacting a dry ethereal solution of the base with absolute alcoholic hydrogen chloride. After recrystallization from isopropanol, this hydrochloride melts at 227–229° C.

Example 29

A mixture of 33 parts of acridan, 45 parts of powdered potassium hydroxide and 66 parts of freshly distilled β-piperidinoethyl chloride is heated for 8 hours at about 100° C., and then for 15 hours at 60–65° C. The mass is extracted with ether and the ether solution is washed with water and dried with anhydrous sodium sulfate. The ether is then evaporated and the residue of 10-β-piperidinoethylacridan is isolated.

Example 30

By a process similar to that of Example 29, using 15 g. of acridan, 30 cc. of β-diethylaminoethyl chloride and 20 g. of powdered potassium hydroxide, there is produced 10-β-diethylaminoethylacridan which distils at 196–203° C. at 4 mm. pressure.

Example 31

110 g. of phenothiazine, 69 g. of powdered sodium hydroxide, and 500 cc. of toluene are heated to 95–100° C. while 95 g. of β-dimethylamino-β-methylpropyl chloride hydrochloride is added in portions over a period of 1½ to 2 hours. After the addition, the mixture is heated for 3 hours at 100±5° C. Some unchanged phenothiazine which crystallizes out when the mass cools is separated by filtration. The toluene filtrate is then extracted by dilute hydrochloric acid. The hydrochloride of 10-(β-dimethylaminoisobutyl)-phenothiazine, which is difficultly soluble in water, separates and is removed by filtration. It can be purified by recrystallization from isopropanol-ether. The hydrochloride is again converted to the free base in the usual way. The free base is purified by distillation; its boiling range at 1 millimeter pressure is 175–180° C.

Example 32

A solution of 211 g. of 2,6-lupetidine, 125 g. of ethylene bromohydrin in 200 cc. of methyl ethyl ketone is warmed for 2 hours at 60–75° C. The lupetidine hydrobromide that separates is removed by filtration and the filtrate is evaporated. The residue of 2,6-lupetidino-ethanol is distilled at 105–108° C., 20 mm. pressure.

79 g. of 2,6-lupetidine-ethanol are treated in 500 cc. of benzene with 120 cc. of thionyl chloride. After the addition of the thionyl chloride, the mixture is refluxed for 2 hours and evaporated to remove excess thionyl chloride and benzene. The residue of β-chloroethyl-2,6-lupetidine is mixed with 130 g. of phenothiazine, 1 liter of toluene and 40 g. of powdered sodium hydroxide. The charge is agitated and refluxed for 30 min. An additional 20 g. of powdered sodium hydroxide is added and the mixture is refluxed for 3 hours. From the organic layer is obtained 10 - (β - 2,6 - lupetidinoethyl)phenothiazine, distilling at 225° C. at 1 mm. pressure.

Example 33

A mixture of 51.3 parts of tetrahydrocarbazole, 20 parts of powdered caustic soda and 74 parts of β-piperidinoethyl chloride is heated at about 100° C. with occasional agitation for 10 hours. Then cold water is added and the mixture is extracted with ether. The ether extract is dried and stripped of solvent under vacuum. There is thus obtained N-β-piperidinoethyltetrahydrocarbazole, a light yellow oil distilling at about 190–193° C. at 5 mm.

Example 34

By the method of Example 33, using 75 parts of β-morpholinoethyl chloride, there is produced N-β-morpholinoethyltetrahydrocarbazole. This product is a light yellow high-boiling oil distilling at about 184–188° C. at 4 mm.

Example 35

N - β - dimenthylaminobutyltetrahydrocarbazole is produced according to the process of Example 21, using 80 parts of β-dimethylaminobutyl bromide, 20 parts of powdered sodium hydroxide and 51.3 parts of tetrahydrocarbazole. It distils at about 147–152° C. at 0.1 mm. pressure.

Example 36

An intimate mixture of 17 parts of tetrahydrocarbazole, 20 parts of γ-diethylaminopropyl chloride and 7 parts of powdered sodium hydroxide is heated to 100–105° C. for 8 hours. Water is added to the chilled reaction mixture and the resulting suspension is extracted with ether. After drying the ether extract is evaporated. There is thus obtained N-γ-diethylaminopropyltetrahydrocarbazole, a light-colored oil distilling in the range of 172–177° C. at 2 mm. pressure.

Example 37

A mixture of 59.7 g. of phenothiazine, 67 g. of β-morpholinoethyl chloride hydrochloride, 40 g. of powdered sodium hydroxide and 500 cc. of toluene is heated and stirred at 95–100° C. for 4 hours. It is filtered and the filtrate evaporated. The residue of 10-(β-morpholinoethyl)phenothiazine thus obtained is distilled at 225–235° C. at 3–4 mm. pressure. The hydrochloride is prepared in dry ether by addition of alcoholic hydrogen chloride and melts at 172–174° C. after recrystallization from isopropanol.

Example 38

By a procedure similar to that of Example 5, but using 225 parts of β-dibutylaminoethyl chloride hydrochloride, there is produced N-β-dibutylaminoethyltetrahydrocarbazole, a viscous, light-colored oil, insoluble in water but soluble in dilute mineral acid.

I claim:

1. The method of producing an N-(aminoalkyl)-tertiary-aromatic amine which comprises heating a secondary aromatic amine with an aminoalkyl halide in the presence of caustic alkali, and separating from the reaction mixture the N-(aminoalkyl)-tertiary-aromatic amine.

2. The method of aminoalkylating a secondary aromatic amine which comprises heating a secondary aromatic amine with an aminoalkyl ester of an acid selected from the group consisting of halogen acids and aromatic sulfonic acids in the presence of caustic alkali.

3. The method of aminoalkylating a secondary aromatic amine of the formula

wherein Ar is an aromatic hydrocarbon radical and R is a hydrocarbon radical, which comprises heating in the presence of caustic alkali said secondary amine with an aminoalkyl halide of the formula X—Alk—B wherein B is an aliphatic amino radical, Alk is a lower alkylene radical and X is halogen.

4. The method of producing a compound of the formula

R—Alk—B wherein R is a tertiary aromatic amino radical selected from the group consisting of diphenylamino, 9-carbazolyl, 10-phenothiazinyl, 9-tetrahydrocarbazolyl, cyclohexylphenylamino, 5-oxo-10-phenothiazinyl, 10-phenoxazinyl, 5-dioxo-10-phenothiazinyl and 10-acridanyl, Alk is a lower alkylene radical, and B is an aliphatic amino radical, which comprises heating in the presence of caustic alkali an amine of the formula

R—H and an aminoalkyl halide of the formula

X—Alk—B wherein X is halogen, and isolating the product so formed.

5. The method of producing a compound of the formula

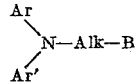

wherein Ar and Ar' are aromatic hydrocarbon radicals, Alk is a lower alkylene radical and B is an aliphatic amino radical, which comprises heating in the presence of caustic alkali an amine of the formula

and an aminoalkyl halide of the formula

X—Alk—B wherein X is halogen, and isolating the product so formed.

6. The method of producing a compound of the formula (C₆H₅)₂N—Alk—B wherein Alk is a lower alkylene radical and B is an aliphatic amino radical, which comprises heating in the presence of caustic alkali diphenylamine with an aminoalkyl halide of the formula X—Alk—B wherein X is halogen, and isolating the product so formed.

7. The method of producing a compound of the formula (C₆H₅)₂N—Alk—NRR' wherein Alk is a lower alkylene radical and R and R' are lower alkyl radicals, which comprises heating in the presence of caustic alkali diphenylamine and an aminoalkyl halide of the formula X—Alk—NRR' wherein X is halogen, and isolating the product so formed.

8. The method of producing a compound of the formula (C₆H₅)₂N—C₂H₄—NRR' wherein R and R' are lower alkyl radicals, which comprises heating diphenylamine in the presence of caustic alkali with a di-lower-alkylaminoethyl halide, and isolating the product so formed.

9. The method of producing β-diethylaminoethyl-diphenylamine which comprises heating diphenylamine in the presence of caustic alkali with β-diethylaminoethyl chloride, and separating the product so formed.

10. The method of producing a 10-aminoalkylphenothiazine of the formula

Phth—Alk—B wherein Phth is a 10-phenothiazinyl radical, Alk is a lower alkylene radical and B is an organic non-aromatic amino radical selected from aliphatic and saturated nitrogen-containing heterocyclic amino radicals, which comprises heating in the presence of caustic alkali phenothiazine with an aminoalkyl ester of the formula X—Alk—B wherein X is halogen, and isolating the product so formed.

11. The method of producing a 10-dialkylamino-alkylphenothiazine of the formula

Phth—Alk—NRR' wherein Phth is a 10-phenothiazinyl radical, Alk is a lower alkylene radical and R and R' are lower alkyl radicals, which comprises heating in the presence of caustic alkali phenothiazine with a dialkylaminoalkyl ester of the formula X—Alk—NRR' wherein X is halogen, and isolating the product so formed.

12. The method of producing a 10-dimethylamino-alkylphenothiazine which comprises heating in the presence of caustic alkali phenothiazine and a dimethylaminoalkyl halide, and isolating the product so formed.

13. The process of producing 10-β-dimethylaminopropylphenothiazine which comprises heating in the presence of caustic alkali phenothiazine and β-dimethylaminopropyl chloride, and isolating the product so formed.

14. The process of producing a 10-aminoalkylphenothiazine of the formula

Phth—Alk—NZ wherein Phth is a 10-phenothiazinyl radical, Alk is a lower alkylene radical and Z represents the elements which with N form a saturated heterocyclic amino radical which is aliphatic in character, which comprises heating in the presence of caustic alkali phenothiazine and an aminoalkyl halide of the formula X—Alk—NZ wherein Z is halogen, and isolating the product so formed.

15. The process of producing a 10-N-pyrrolidino-alkylphenothiazine which comprises heating in the presence of caustic alkali phenothiazine and an N-pyrrolidinoalkyl halide, and isolating the product so formed.

16. The process of producing 10-β-N-pyrrolidino-ethylphenothiazine which comprises heating in the presence of caustic alkali phenothiazine and β-N-pyrrolidinoethyl chloride, and isolating the product so formed.

17. The method of aminoalkylating a heterocyclic amine wherein a hetero nitrogen atom is linked directly to at least one aromatic ring and to a hydrogen atom which comprises heating said heterocyclic amine in the presence of caustic alkali with an aminoalkyl halide of the formula X—Alk—B wherein B is an amino radical, Alk is a lower alkylene radical, and X is halogen.

18. The process of making β-dimethylaminoethyl phenothiazine which comprises treating phenothiazine with β-dimethylaminoethyl chloride hydrochloride and solid alkali metal hydroxide in the presence of an inert hydrocarbon solvent, and separating the product.

References Cited in the file of this patent

UNITED STATES PATENTS

| Number | Name | Date |
| --- | --- | --- |
| 2,016,480 | Bockmuhl et al. | Oct. 8, 1935 |
| 2,180,344 | Blicke | Nov. 21, 1939 |
| 2,230,774 | Bockmuhl et al. | Feb. 4, 1941 |
| 2,461,038 | Cusic | Feb. 8, 1949 |
| 2,483,998 | Hunter et al. | Oct. 4, 1949 |

FOREIGN PATENTS

| Number | Country | Date |
| --- | --- | --- |
| 138,199 | Switzerland | May 1, 1930 |
| 377,255 | Great Britain | July 14, 1932 |
| 917,595 | France | Sept. 16, 1946 |

OTHER REFERENCES

Charpentier, Compt. rend (Fr. acad.), vol. 225, p. 306 (August 1947).

Gilman et al., J. Am. Chem. Soc., vol. 66, pp. 888–9 (1944).

Eisleb, Ber. der Deu. Chem., vol. 74 (1941), pp. 1433–50.